(12) United States Patent
Dias et al.

(10) Patent No.: US 6,170,017 B1
(45) Date of Patent: Jan. 2, 2001

(54) METHOD AND SYSTEM COORDINATING ACTIONS AMONG A GROUP OF SERVERS

(75) Inventors: Daniel Manuel Dias, Mahopac; Arun Kwangil Iyengar, Yorktown Heights, both of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 08/854,010

(22) Filed: May 8, 1997

(51) Int. Cl.[7] .............................. G06F 15/16; G06F 15/17

(52) U.S. Cl. ........................................... 709/235; 709/226

(58) Field of Search ..................... 709/226, 235

(56) References Cited

U.S. PATENT DOCUMENTS

| | | | |
|---|---|---|---|
| 5,241,594 | 8/1993 | Kung | 380/4 |
| 5,265,250 | * 11/1993 | Andrade et al. | 395/650 |
| 5,392,400 | * 2/1995 | Berkowitz et al. | 395/200 |
| 5,416,842 | 5/1995 | Aziz | 380/30 |
| 5,428,771 | * 6/1995 | Daniels et al. | 395/575 |

(List continued on next page.)

FOREIGN PATENT DOCUMENTS

| | | | |
|---|---|---|---|
| 273061 | 3/1996 | (CN) . | |
| 0615362 | 8/1993 | (EP) . | |
| 0 762 297 A2 | 3/1997 | (EP) | G06F 17/24 |
| 0 817 445 A2 | 1/1998 | (EP) | H04L 29/06 |
| 8249253 | 9/1996 | (JP) . | |

(List continued on next page.)

OTHER PUBLICATIONS

Gifford et al., "Payment Switches for Open Networks," Proceedings of the First USENIX Workshop of Electronic Commerce, New York, NY, Jul. 1995, pp. 69–75 (Abstract).

"Passport File for Secure Access to the Internet," IBM Technical Disclosure Bulletin, vol. 39, No. 2, Feb. 1996, pp. 333–334.

(List continued on next page.)

*Primary Examiner*—Mark H. Rinehart
*Assistant Examiner*—Stephan Willett
(74) *Attorney, Agent, or Firm*—Baker Botts L.L.P.; David M. Shofi (57) ABSTRACT

In a client-server environment having a server group including one or more participating servers and one or more controller servers, where each participating server can communicate with at least one controller server, a method for coordinating actions among the servers in the server group comprising the steps of: (1) communicating between a client and at least one of the servers in the server group using a protocol that has limited or no defined procedures for passing state information between the client and the servers; (2) transmitting a request for an action from the client to one of the servers; and (3) communicating among a plurality of servers with at least one controller server coordinating actions of at least some of the servers in response to the request. A preferred embodiment of the method includes providing client identification information once by the client during a conversation, verifying the client identification information by one or more controller servers, generating client authentication information by one or more controller servers that is preserved in the conversation, and using the preserved client authentication information to automatically authenticate the client during the remainder of the conversation. Another preferred embodiment of the method includes transmitting a request by a client requiring participation by a plurality of servers and communicating among the servers with at least one controller server coordinating the actions of a plurality of servers in response to the request from the client.

16 Claims, 5 Drawing Sheets

U.S. PATENT DOCUMENTS

| | | | |
|---|---|---|---|
| 5,434,994 | | 7/1995 | Shaheen et al. ..................... 395/500 |
| 5,485,579 | * | 1/1996 | Hitz et al. ........................ 395/200.12 |
| 5,497,463 | | 3/1996 | Stein et al. ....................... 395/200.03 |
| 5,568,612 | | 10/1996 | Barrett et al. .................... 395/200.01 |
| 5,572,643 | | 11/1996 | Judson ................................ 395/793 |
| 5,644,720 | * | 7/1997 | Boll et al. ........................ 395/200.01 |
| 5,708,780 | | 1/1998 | Levergood et al. ............. 395/200.12 |
| 5,764,155 | * | 6/1998 | Kertesz et al. ................... 340/825.08 |
| 5,781,743 | * | 7/1998 | Matsuno et al. ................ 395/200.58 |
| 5,793,964 | * | 8/1998 | Rogers et al. ................... 395/200.32 |
| 5,862,339 | * | 1/1999 | Bonnaure et al. .............. 395/200.57 |
| 5,890,161 | * | 3/1999 | Helland et al. ...................... 707/103 |

FOREIGN PATENT DOCUMENTS

| | | | |
|---|---|---|---|
| 8249387 | 9/1996 | (JP) . | |
| 9632701 | 10/1996 | (WO) . | |
| WO 97/15885 | 5/1997 | (WO) | ............................ G06F 13/00 |
| WO 97/50034 | 12/1997 | (WO) | ............................ G06F 11/26 |

OTHER PUBLICATIONS

Gifford et al., "Payment Switches for Open Networks," Digest of Papers, COMPCON '95, Technologies for the Information Superhighway, 1995, pp. 26–31 (Abstract).

Haller, "The S/Key One–Time Password System," Proceeding Internet Society Symposium on Network and Distributed System Security, San Diego, 1994, pp. 151–157 (Abstract).

\* cited by examiner

USER ID —— 401

SESSION ID —— 402

VISITED NODES —— 403

METHOD AND SYSTEM COORDINATING ACTIONS AMONG A GROUP OF SERVERS

BACKGROUND OF THE INVENTION

This invention relates to a method for coordinating actions among a group of servers. More particularly, this invention relates to a method for coordinating the authentication of clients, aggregation of information, group transactions, and multi-phase commits across a group of servers. The preferred embodiment of the present invention relates to commerce on the World Wide Web.

Electronic commerce is increasing exponentially, especially on the World Wide Web. Many businesses have set up virtual stores on Web sites that allow consumers to shop and purchase products on-line. As a logical progression from these individual virtual stores, virtual malls have also begun to appear on the Web.

As with real malls, virtual malls provide an opportunity to benefit both businesses and consumers. Businesses potentially benefit from their visibility on the mall. For example, a virtual store on a virtual mall may catch the attention of a consumer who originally comes to the mall to buy goods from another store. Consumers may benefit from the opportunities for integration and coordination of goods and services on the mall. A virtual mall may provide, for example, an integrated directory of the goods and services of many virtual stores. In addition, a virtual mall may provide a single point of authentication for all of the virtual stores on the mall. A virtual mall could also coordinate group transactions involving multiple stores.

Thus far, the virtual malls that have appeared on the Web have taken one of two approaches. First, some malls provide a Web page with hyperlinks to independent virtual stores. Second, some malls have provided multiple virtual stores within the same Web site. These latter malls have utilized such systems as the IBM World Avenue system (http://mer.shop.ibm.com) and the Netscape Merchant System (http://home.netscape.com/comprod/products/iapps/capps/mersys.html).

Each of these approaches has disadvantages. The first approach does not provide any coordination among the individual stores except for the collection of their URLs. The second approach, while providing coordination among individual stores, is restrictive in that the virtual stores must be implemented and managed within a single Web site. Thus, to join a virtual mall using the second approach, a business with an established virtual store on the Web may be required to significantly change its implementation.

Accordingly, there is a need for a method for coordinating multiple, independent virtual stores that can be distributed across multiple Web sites.

SUMMARY OF THE INVENTION

The present invention is directed to a method for coordinating actions among a group of servers. The preferred embodiment for the present invention relates to coordinating multiple virtual stores on the Web, but the present invention applies to other forms of networked communications as well.

It is an object of the present invention to provide a method for coordinating single authentication of a client among a set of stores, such that a client, once prompted for authentication information, can execute transactions at any store or across any subset of stores without further prompting for authentication.

It is a further object of the present invention to coordinate the integration of information from multiple stores. For example, it is desirable to integrate the items contained in the shopping basket of each store a client has visited and to provide a single display of this information to the client. As another example, it is desirable to allow a client to specify keywords for a search, send the search request to any subset of the stores, and send the combined search results to the client.

It is a further object of the present invention to coordinate requests for group transactions involving multiple stores. For example, a client may request a group purchase, which involves an "all-or-nothing" purchase of a set of items across stores. Such a purchase might involve, for example, a matching jacket and slacks from different stores. This type of request may be used in conjunction with a single or multi-phase commit across the stores.

The architecture of the present invention is a client-server environment having a server group including one or more participating servers and one or more controller servers, where each participating server can communicate with at least one controller server. In this environment, the present invention is directed to a method for coordinating actions among the servers in the server group, which comprises the steps of: (1) communicating between a client and at least one of the servers in the server group using a protocol that has limited or no defined procedures for passing state information between the client and the servers; (2) transmitting a request for an action from the client to one of the servers; and (3) communicating among a plurality of servers with at least one controller server coordinating actions of at least some of the servers in response to the request.

Preferred embodiments of the present invention include coordinating the authentication of a client during a conversation and coordinating a group transaction requested by a client. To coordinate the authentication of a client during a conversation, a preferred method according to the present invention comprises the steps of: (1) communicating between a client and at least one of the servers in the server group using a protocol that has limited or no defined procedures for passing state information between the client and the servers; (2) transmitting a request for a first action by a client to a server that requires authentication; (3) providing client identification information by the client; (4) verifying the client identification information by one or more controller servers; (5) generating client authentication information by one or more controller servers; (6) maintaining the client authentication information by one or more servers; (7) utilizing a means by one or more servers for preserving the client authentication information in the conversation; (8) transmitting a request for a second action by the client to one of the servers that requires authentication; and (9) using the client authentication information preserved in the conversation and the client authentication information maintained by the servers to authenticate the client.

To coordinate a group transaction requested by a client, a preferred method according to the present invention comprises the steps of: (1) communicating between a client and at least one of the servers in the server group using a protocol that has limited or no defined procedures for passing state information between the client and the servers; (2) transmitting a request for an action requiring participation by a plurality of servers from the client to one of the servers; and (3) communicating among the servers with at least one controller server coordinating the actions of the plurality of servers in response to the request.

These and other features, aspects, and advantages of the present invention will become better understood with regard to the following detailed description, appended claims, and accompanying drawings.

DETAILED DESCRIPTION

As used in this specification and the appended claims, the term "client" is a program or application that issues commands to another program or application (called a server) which performs the tasks associated with the commands.

As used in this specification and the appended claims, the term "common gateway interface" (CGI) is a mechanism by which a World Wide Web client can request the execution of a program on a Web site. The Web site runs the CGI program and sends the output of the program to the client.

As used in this specification and the appended claims, the term "continuation" is a new request that a client may send to a server, which was provided by the server in response to a previous request by the client. Hypertext links (or hyperlinks) are examples of continuations in client-server communications. Whenever a client makes a request to a server, the server may include one or more continuations in its response. Although a continuation provided by the server could be any valid request, useful continuations are generally logically related to the original request by the client.

As used in this specification and the appended claims, the term "conversation" is a sequence of communications between a client and a server in which the server responds to each request from the client with a set of continuations, and the client always picks the next request from the set of continuations provided by the server. On the World Wide Web, hypertext links are examples of continuations, and a client engages in a conversation with a server whenever it follows the hypertext links provided by the server. More formally, a series of HTML Web pages $h_1, h_2, \ldots h_n$ constitutes a conversation if: (1) pages $h_1, h_2, \ldots h_n$ were all viewed by a client; and (2) for all i such that $1<i<=n$, page $h_i$ was obtained by following a hypertext link on page $h_{i-1}$. In an uninterrupted conversation, the client simply follows n−1 hypertext links to get from page $h_1$ to $h_n$ without ever backtracking. In an interrupted conversation, the client backtracks at least once. Backtracking refers to the process where a client: (1) initially visits a page $h_i$ where $1<=i<n$; (2) views other pages either by following hypertext links, explicitly requesting URLs, or using the Web browser's cache; and (3) returns to page $h_i$ by reloading $h_i$ from memory (such as from the browser's cache).

As used in this specification and the appended claims, the term "home page" is a table of contents that guides a World Wide Web user to information that is stored on a Web site. Often, a home page contains multimedia content.

As used in this specification and the appended claims, the term "hyperlink" or "hypertext link" is a network address, such as a Universal Resource Locator, that is embedded in a word, phrase, icon, or picture, which is activated when a person selects it. When a client activates a hyperlink, information corresponding to the hyperlink is returned to the client and displayed using a Web browser.

As used in this specification and the appended claims, the term "HyperText Markup Language" (HTML) is the language used by Web servers to create and connect Hypertext documents that are viewed by Web clients. Other uses of Hypertext documents are described in U.S. Pat. No. 5,204,947, issued Apr. 20, 1993, to Bernstein et al.; U.S. Pat. No. 5,297,249, issued Mar. 22, 1994, to Bernstein et al.; and U.S. Pat. No. 5,355,472, issued Oct. 11, 1994, to Lewis. All of these patents are assigned to International Business Machines Corporation and are incorporated by reference herein.

As used in this specification and the appended claims, the term "Hypertext Transfer Protocol" (HTTP) is a protocol used by the World Wide Web to transfer data between computers. HTTP allows a client to obtain data from a server either by requesting a file or invoking a CGI program. HTTP is a stateless protocol, which means that every request from a client to a server is treated independently. The server has no record of previous connections with a client. At the beginning of a URL, "http:" indicates the protocol to be used is HTTP.

As used in this specification and the appended claims, the term "Internet" is a collection of computer networks and gateways connected to each other using the TCP/IP protocol.

As used in this specification and the appended claims, the term "server" is a program or application that performs a task at the command of another program or application (called a client). As used in this specification and the appended claims, a Web site may be a server. The term "server" is not synonymous with the Web servers that support Web sites.

As used in this specification and the appended claims, the term "transaction" refers to any request made by a client to a server.

As used in this specification and the appended claims, the term "Transmission Control Protocol/Internet Protocol" (TCP/IP) is a collection of protocols that divides data into packets, routes the packets through the network, and reconstructs the packets at their destination. The data may be anything from e-mail text to video.

As used in this specification and the appended claims, the term "Universal Resource Locator" (URL) is a way to uniquely identify or address information on the Web. A URL can be considered to be the Web equivalent of an e-mail address. URLs can be cumbersome if they belong to documents buried deep within others, but they can often be accessed with a hyperlink. An example of a URL is: "http://www.arun.com:80/table.html".

A URL has four components. Starting from the left, the first component specifies the protocol to be used. It is separated from the rest of the URL by a colon. The next component is the hostname or IP (Internet Protocol) address of the target host. This component is delimited on the left by "//" and on the right by "/" or a colon. The third component is an optional port number. When this component is used, it is delimited on the left by a colon and on the right by a "/". The fourth component is the actual file name or program name.

In the example given above, the protocol is "http", the hostname is "www.arun.com", the port number is "80", and the file name is "table.html". In this example, "http" refers to the Hypertext Transport Protocol, and the "html" extension of the file name refers to the HyperText Markup Language.

As used in this specification and the appended claims, the term "Web browser" is a client program that allows a person to display the hypertext documents on the World Wide Web. A Web browser acts as an Internet tour guide, complete with pictorial desktops, directories and search tools, which can be used by a person to navigate or "surf" the Internet.

As used in this specification and the appended claims, the term "World Wide Web" (the "Web") is a collection of hypertext documents on the Internet. A hypertext document contains hyperlinks to other documents, which a person can use to navigate from document to document. In practice, people seeking information on the Internet can use the Web to switch from server to server and database to database by selecting hyperlinks, which are usually displayed as highlighted words or phrases in the documents. The resources on the Web are accessible through Universal Resource Locators (URLs). The Web utilizes the HyperText Markup Language (HTML) to display the information corresponding to URLs and to provide a point-and-click interface to other URLs.

Figure 1:
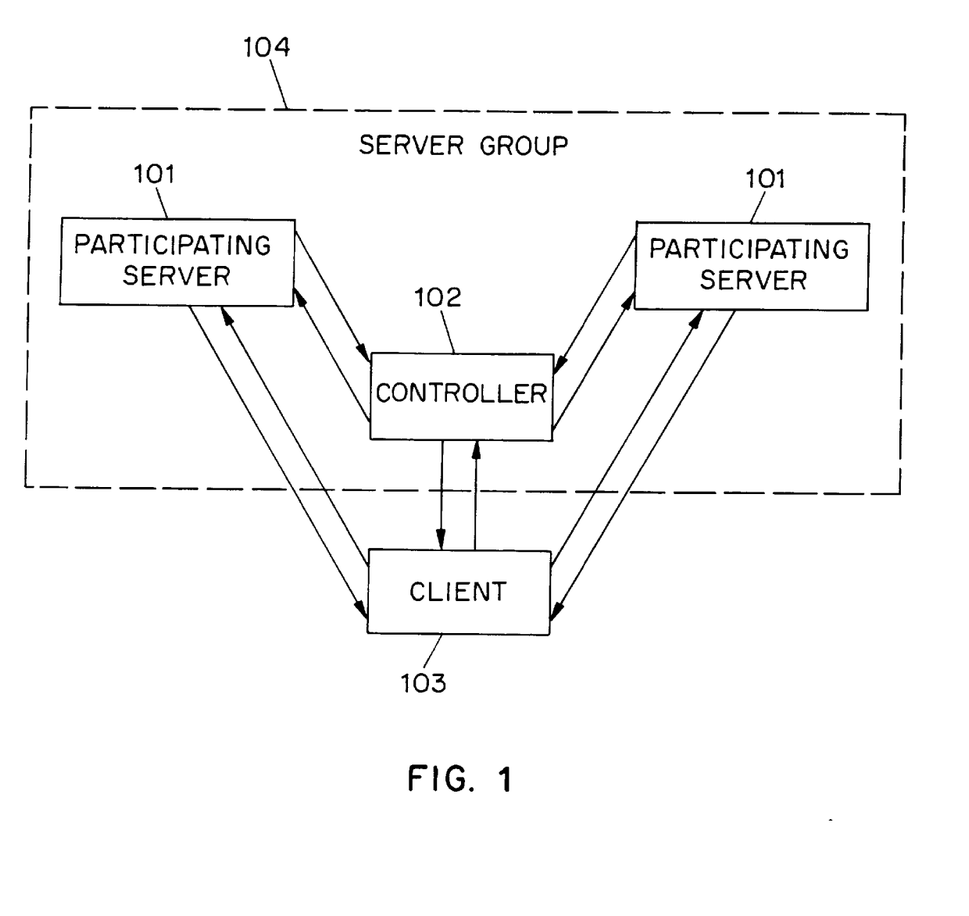
FIG. 1 is a block diagram of an overall architecture used in accordance with a preferred embodiment of the present invention.

As shown in FIG. 1, an overall architecture used in accordance with a preferred embodiment of the present invention consists of a client 103 and a server group 104, which includes participating servers 101 and a controller server 102. (For the sake of brevity, the controller server 102 will be referred to simply as the controller in this specification.) The physical location of the participating servers and the controller is unimportant. Each participating server 101 and the controller 102 may reside on separate computers connected by a network, or alternatively, multiple servers may reside on a single computer. It is also possible for the controller and/or one or more participating servers to reside on several computers at once. For example, this would be the case if the controller and/or one or more of the participating servers were implemented as scalable Web servers. (For information on scalable Web servers, see D. Dias et al., "A Scalable and Highly Available Web Server" in: *Proceedings of COMPCON '96*.)

The controller 102 maintains client account information (for example, user IDs, user names, passwords, addresses, and telephone numbers). As shown in FIG. 1, each participating server 101 is capable of communicating with the controller 102, and the client 103 is capable of communicating with each participating server 101 and the controller 102. The controller and participating servers may communicate with each other using a standard protocol such as HTTP. Alternatively, they may communicate using a proprietary protocol.

The client 103 communicates with the participating servers 101 and the controller 102 via a communications protocol, such as HTTP, which has limited or no defined procedures for maintaining client state information. Limited or no defined procedures for maintaining client state information means that for a nonempty subset of the types of communications between a client and a server using the protocol, it is difficult or impossible to preserve state variables such as the client's identity or the client's password in a conversation using the procedures defined by the protocol so that the state variables can be subsequently retrieved by a server during the remainder of the conversation.

There are two types of transactions that a participating server may perform. First, a participating server may perform a simple transaction. A participating server can perform simple transactions on behalf of a client independently of other participating servers and the controller. Accordingly, a client may request a simple transaction directly from a participating server. Second, a participating server may perform a group transaction. A group transaction is performed by one or more participating servers under the coordination of the controller. Preferably, a client may request a group transaction only from the controller.

Figure 2:
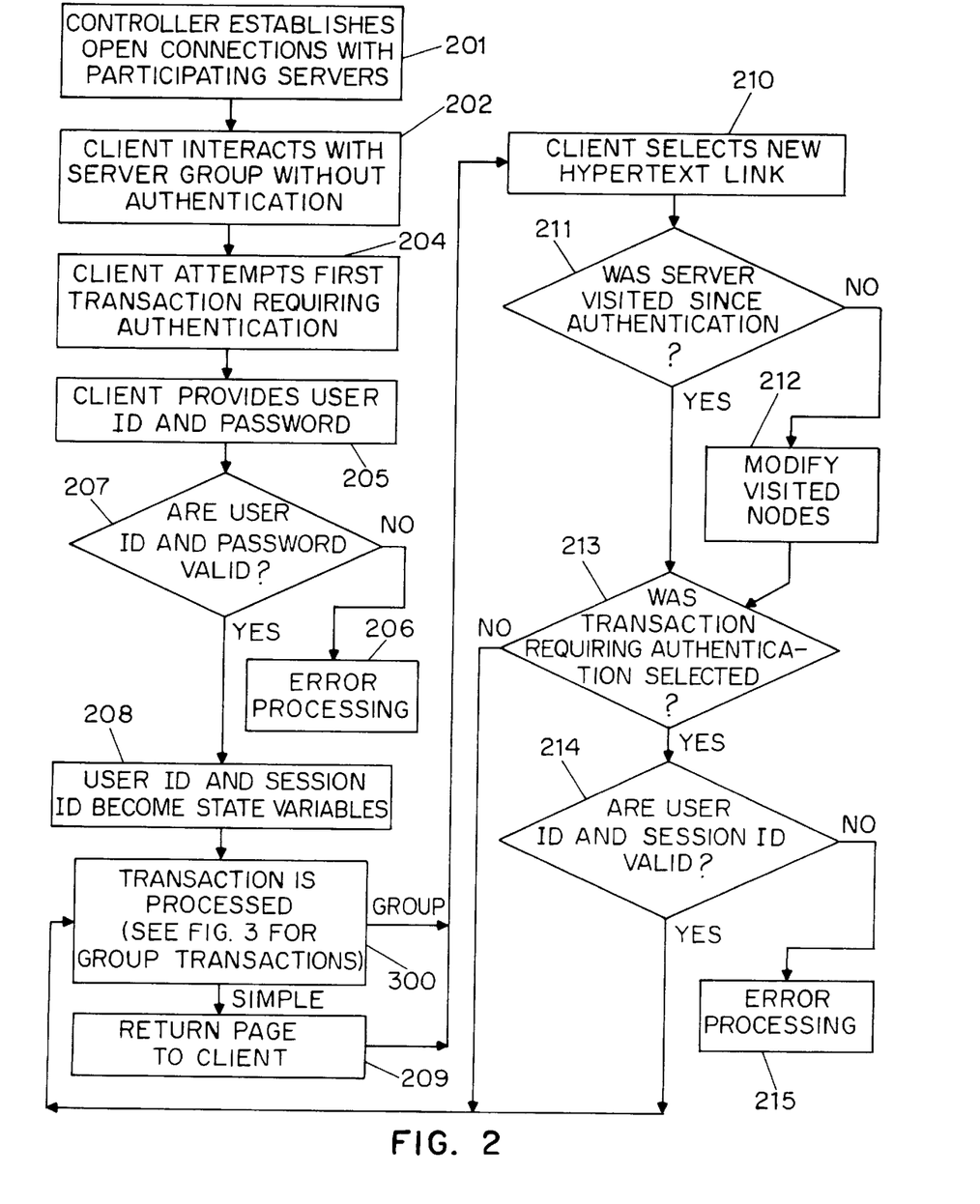
FIG. 2 is a block diagram of a method for coordinating the authentication of a client in accordance with a preferred embodiment of the present invention.

FIG. 2 shows a preferred embodiment of the present invention in which the controller 102 coordinates the authentication of the client 103 among the participating servers. Authentication is the process whereby the client 103 identifies itself to a server in the server group 104. In this preferred embodiment, client 103 only needs to be prompted for identification information once during a conversation by any participating server or controller to perform transactions on any server in the server group during the remainder of the conversation.

In Step 201, the controller preferably establishes open connections with the participating servers. Alternatively, the controller could establish a new connection each time it needed to communicate with a participating server. Maintaining open connections as depicted in Step 201, however, will most likely result in better performance than establishing a new connection each time.

In Step 202, the client 103 interacts with the server group without authenticating itself. The client, for example, may be browsing catalogs.

In Step 204, the client 103 attempts to perform the first transaction of the conversation that requires authentication.

In Step 205, the client inputs a user ID 401 and a password via an HTML form. To preserve confidentiality, information passed between the client and the server group is preferably encrypted using a system such as the Secure Sockets Layer (SSL). (For information on SSL, see A. O. Freier, P. Karlton, and P. C. Kocher, "The SSL Protocol Version 3.0", Internet Draft, March 1996, http://home.netscape.com/eng/ssl3/ssl-toc.html).

In Step 207, the server contacted by the client checks whether the client has entered a valid user ID 401 and password. If the server contacted by the client is a participating server, the participating server must contact the controller to validate the user ID 401 and password. If the client has not entered a valid user ID 401 and password, error processing takes place at Step 206.

Step 206 can be implemented in a number of ways. As a first alternative, the client could be given a new opportunity to enter a user ID 401 and password. As a second alternative, the client could be given an opportunity to register as a new user. In this case, the client would be prompted to enter further information such as a name, address, and telephone number. As a third alternative, the conversation could be terminated with an error message. The last alternative is the preferred method of handling error processing. Of course, other implementations are also possible.

If a valid user ID 401 and password have been entered in Step 207, the controller generates a session ID 402 in Step 208. Session IDs are used to authenticate the client for the duration of the conversation. They are selected randomly from a large enough key space so that a malicious user is unlikely to guess a session ID. The controller stores the user ID and session ID in a database. (Other storage methods, such as a file system, can also be used). The current session ID overwrites any previously stored session ID for a particular user ID.

In Step 208, the server contacted by the client preserves the user ID 401 and session ID 402 in the conversation as state variables. As used in this specification and the appended claims, to preserve state information in a conversation means to preserve the information so that any server in the server group will be able to gain access to the information in future communications with the client during the conversation.

Figure 5:
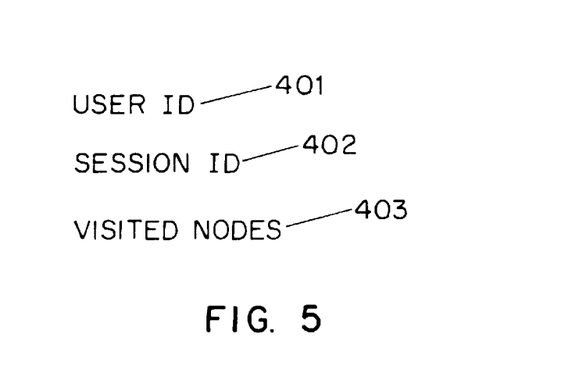
FIG. 5 is a list of preferred variables preserved in a conversation.

In Step 208, the server also encodes its identity in a visited nodes state variable 403, and preserves the visited nodes state variable in the conversation. The visited nodes state variable 403 comprises one or more state variables which represent the participating servers which have been visited by a client since authentication. It is possible to represent all servers which have been visited using a single variable. However, it may be desirable to use multiple variables to represent more detailed information, such as participating servers visited before authentication, participating servers visited after authentication, and participating servers where simple transactions have been performed.

The state information the controller stores in its database to authenticate the client and the state information preserved in the conversation are not necessarily identical. One may contain more or less state variables than the other. Nonetheless, at least some of the variables stored in each are the same. For example, in our preferred embodiment, the user ID and session ID variables are both stored in the controller database and preserved in the conversation. As used in this specification and the appended claims, the term "client authentication information" refers to the set of variables that are both stored by a server and preserved in the conversation.

The preferred method for preserving state variables in a conversation is dynamic argument embedding. In dynamic argument embedding, a server recursively embeds state information into the continuations it sends to a client. Using this method, whenever a client selects a continuation, it sends the state information back to the server as part of the continuation. The server then examines the state information as necessary, processes the request, and embeds the state information once again into the next set of continuations sent to the client.

In the context of the World Wide Web, dynamic argument embedding modifies hyperlinks to preserve state information. In general, hyperlinks are changed to invoke a special program known as an argument embedder. The argument embedder passes the state information preserved in the hyperlinks to other CGI scripts on a Web site. In addition, the argument embedder modifies all of the hyperlinks in the resulting output of CGI scripts to invoke itself. Thus, a client following a conversation in which state is preserved using dynamic argument embedding is passed hyperlinks that are all calls to the argument embedder.

Figure 6:
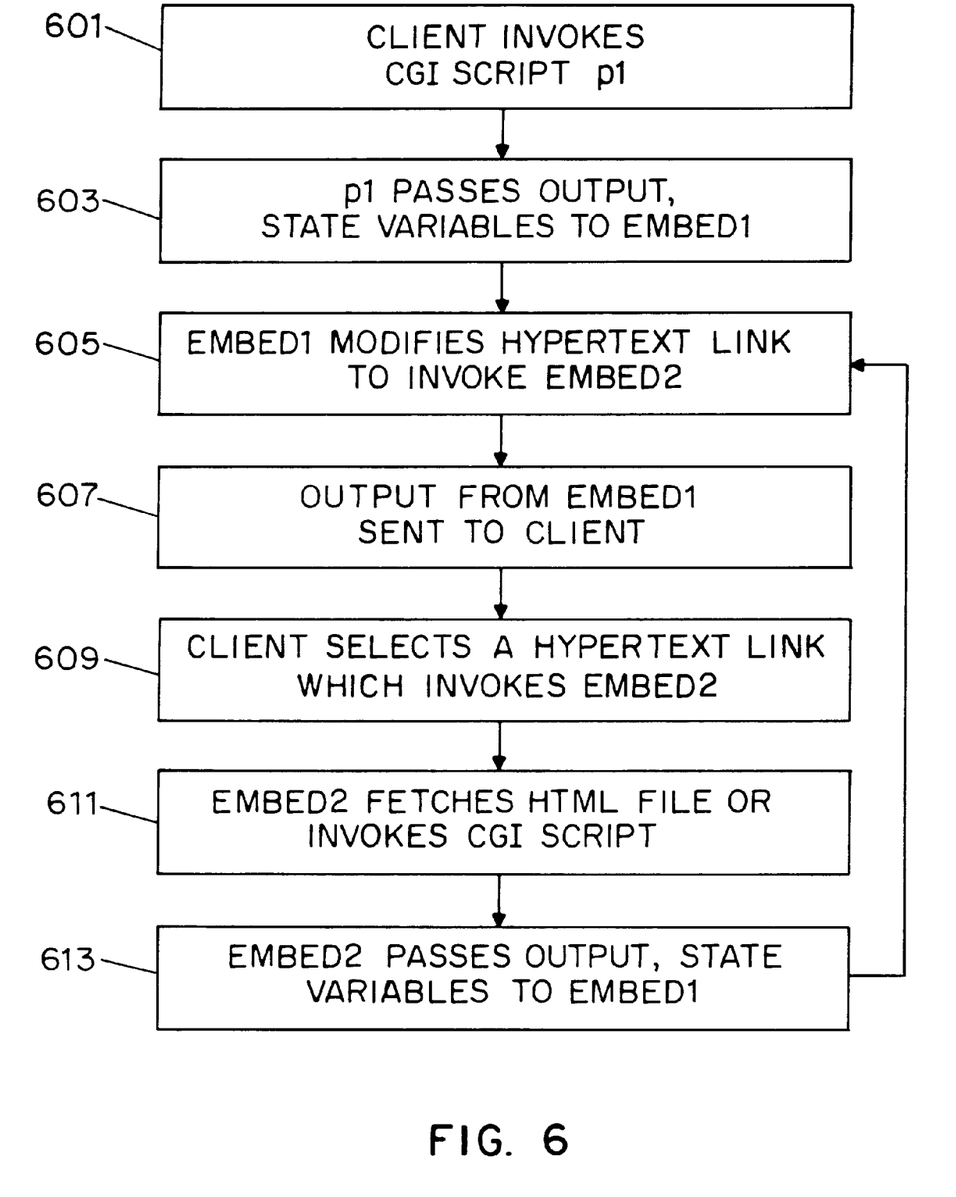
FIG. 6 is a block diagram of a method for dynamically embedding state information in World Wide Web hyperlinks.

FIG. 6 illustrates a method for using dynamic argument embedding to preserve state information in hyperlinks on the Web. In Step 601, a client invokes a CGI script $p_1$ on a Web site.

In Step 603, CGI script $p_1$ determines that state variables $x_1, x_2, \ldots x_n$ should be embedded in the conversation so that these variables will be accessible to all of the CGI scripts that may be invoked during the conversation. CGI script $p_1$ generates an HTML page h with hypertext links for the client to continue the conversation. Instead of returning page h to the client directly, however, $p_1$ invokes a module of the argument embedder called embed1. CGI script $p_1$ passes page h and the state variables $x_1, x_2, \ldots x_n$ to embed1.

In Step 605, the embed1 module modifies all of the hypertext links in page h to invoke another module of the argument embedder called embed2. The arguments passed to embed2 depend on whether a link in page h is to an HTML file or a CGI script. If a link in page h is to an HTML file, embed2 is passed an absolute reference to the file and all state variables. If a link in page h is to a CGI script, embed2 is passed an absolute reference to the CGI script, the original arguments to the CGI script, a parameter delimiting the end of the original arguments, and the state variables.

For example, suppose that CGI script $p_1$ passes the state variables x1=32 and x2=45 to embed1, along with an HTML page containing the two hyperlinks:

(1) "http://www.watson.ibm.com/mail.html"; and (2) "http://www.watson.ibm.com/cgi-bin/prog?arg1=55".

The module embed1 converts these two hyperlinks, respectively, to:

(1) "http://www.watson.ibm.com/cgi-bin/embed2?url=//www.watson.ibm.com/mail.html&x1=32&x2=45"; and (2) "http://www.watson.ibm.com/cgi-bin/embed2?url=//www.watson.ibm.com/cgi-bin/prog&arg1=55&comma=1&x1=32&x2=45".

The string "comma=1" in the second hyperlink allows embed2 to distinguish the original argument, arg1, from the state variables, x1 and x2. Any unique variable name can be used as the delimiter. If there is a danger that "comma" may conflict with another variable of the same name, a more sophisticated method could be used to pick a unique delimiter variable name.

In Step 607, the embed1 module sends an HTML page h' to the client consisting of the modified hyperlinks. All hypertext links in page h' are calls to embed2.

In Step 609, the client selects a hypertext link from page h' to continue the conversation. The hypertext link invokes the module embed2.

In Step 611, embed2 processes the request. If the argument to embed2 contains a file, the file is fetched. If the argument to embed2 contains a call to a CGI script, the CGI script is invoked with the original arguments and the state variables. Using the example given above, if the first hyperlink were chosen by the client, embed2 would fetch the file "mail.html". If the second hyperlink were chosen by the client, embed2 would call the CGI script "prog" with the original variable arg1=55 and the state variables x1=32 and x2=45.

In Step 613, once the appropriate HTML file is fetched or CGI script is invoked, the resulting output and the state variables are passed to embed1. The process then returns to Step 605, in which embed1 modifies the hyperlinks in the output. (A full discussion of dynamic argument embedding is provided in A. Iyengar, "Preserving State in Stateless Network Protocols", U.S. patent application Ser. No. 08/660,633, filed Jun. 7, 1996.)

Although dynamic argument embedding is the preferred method for preserving state in a conversation, NETSCAPE cookies can also be used. A NETSCAPE cookie is a non-standard HTTP feature by which a server returning an HTTP object to a client may also send a piece of state information which the client stores. Included in the state information is a description of the range of URLs for which the state information is valid. If a client supports NETSCAPE cookies, a client will check any HTTP requests it sends to see if the URL of a request falls within the range of any unexpired cookies the client has stored. If an HTTP request falls within a range defined by a cookie, the client will include the state information corresponding to that cookie with its HTTP request. (For a full discussion of NETSCAPE cookies, see "Persistent Client State HTTP Cookies", Netscape Communications Corporation, 1996, http://home.netscape.com/newsref/std/cookie_spec.html.)

There are a number of advantages to using dynamic argument embedding over NETSCAPE cookies. By using dynamic argument embedding, the lifetime of all state information is tied to the lifetime of a conversation. Every time a new conversation is started between a client and the server group, new state information is generated. Using cookies, it is not possible to tie the lifetimes of state information to the lifetimes of conversations. Another drawback to cookies is that they are not part of the standard HTTP protocol and, thus, may not work with all clients and Web servers. By contrast, dynamic argument embedding works with any client or Web server supporting HTTP. Another advantage of dynamic argument embedding is that access to multiple accounts can be provided concurrently by caching Web pages corresponding to different accounts at the client.

HTML forms can also be used to preserve state. An HTML form can be used by a server to embed hidden variables into a form, which are returned to the server when the form is submitted by the client. The use of HTML forms is restrictive and cumbersome, however, because the server must always respond to a client with a dynamically generated HTML form to preserve state information throughout the conversation.

In Step 300, the transaction is processed. If the transaction is a simple transaction, the participating server or controller handles the transaction by itself. If the transaction requested is a group transaction from the controller, processing is handled by the steps in FIG. 3.

In Step 209, the server handling the simple transaction returns an HTML page to the client with hypertext links for continuing the conversation. Before the page is sent to the client, state information may be included in the page. For example, if the server group is using dynamic argument embedding, the hypertext links on the page must be modified as discussed above. Even if the server group is not using dynamic argument embedding, it may be necessary to modify the hypertext links in the page to enable the system to keep track of the participating servers that have been visited since authentication of the client. For example, the hypertext links in the page that correspond to participating servers that are not sending the page could be modified to invoke a CGI script that will update the visited nodes state variable 403, if necessary.

In Step 210, once a transaction is processed, and a response page has been returned to the client, the client continues the conversation by selecting a new hypertext link from the response page (possibly in conjunction with entering other information).

In Step 211, if the hypertext link selected in Step 210 points to a participating server, a CGI script determines whether the server has been visited since authentication. It does so by examining the visited nodes state variable 403. If the server has not been visited since authentication, the server is added to the visited nodes state variable 403 in Step 212.

In Step 213, the server contacted by the client determines if the client has tried to perform a transaction that requires authentication. If the client has not, the transaction is processed in Step 300.

If the server determines that a transaction requiring authentication has been selected, processing continues at Step 214. In this step, the server verifies that the user ID 401 and session ID 402 are valid. If the server is a participating server, the controller must be contacted, in a preferred embodiment, to verify the validity of the user ID and session ID. If the user ID and session ID are not valid, error processing takes place in Step 215. As described previously in relation to Step 206, error processing can be handled in a number of ways, but preferably the server ends the conversation by responding with a page containing an error message. If the user ID and session ID are valid, the transaction is handled in Step 300 as described earlier.

Figure 3:
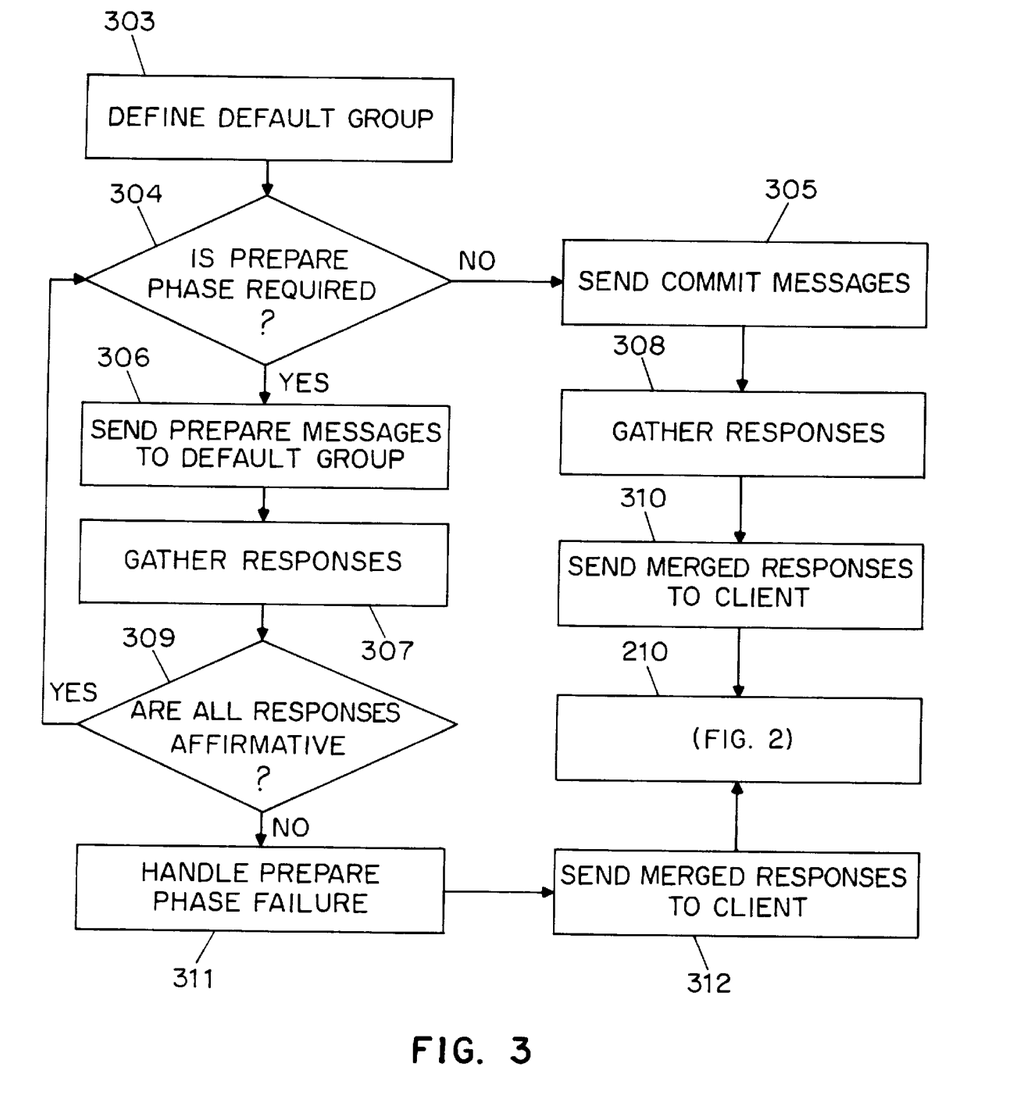
FIG. 3 is a block diagram of a method for coordinating a group transaction among participating servers in accordance with a preferred embodiment of the present invention.

If the transaction requested by a client is a group transaction, the coordination among the participating servers is performed according to the preferred embodiment of the invention in FIG. 3.

In Step 303, the controller constructs a default group of participating servers consisting of all participating servers which have been visited since authentication. This information is contained in the visited nodes state variable 403. The client has the option of either accepting the default group or overriding the default group with a set of participating servers of its own choosing.

The group transaction may take place in n phases for some finite n>0. The first n−1 phases are known as the prepare phases. The last phase is known as the commit phase. Step 304 determines if any prepare phases still need to be performed. If a prepare phase remains to be performed, in Step 306, the controller sends appropriate prepare messages to all participating servers in the group defined in Step 303.

In Step 307, the controller gathers responses from all participating servers in the defined group and adds the responses to those from previous phases. Participating servers respond with either affirmative or negative responses. If a participating server fails to respond within a timeout period, the response is presumed to be negative. As part of their responses, participating servers may send HTML text. Because the format of HTML text is flexible, each participating server can send customized responses to group actions which include combinations of hypertext links, images, and multimedia content of the participating server's choice.

In Step 309, the controller checks whether all the responses are affirmative. If the response of any participating server is negative, the processing moves to Step 311. In Step 311, the controller informs all participating servers that responded affirmatively in Step 309 that the prepare phase failed.

In Step 312, the controller merges the responses from the participating servers that responded affirmatively into a single page along with a message informing the client of the prepare phase that failed and the participating servers failing the prepare phase. The page returned to the client also contains hypertext links for the client to continue the conversation.

If the controller determines in Step 309 that a prepare phase succeeded on all participating servers in the defined group, processing returns to Step 304. If all prepare phases successfully complete, processing goes to Step 305. In Step 305, the controller sends commit messages to all participating servers in the defined group.

In Step 308, the controller gathers responses from all participating servers in the defined group. As described above, participating servers may include HTML text in their responses. In Step 310, the controller produces a single page response that is sent to the client by merging several items. First, the controller merges all of the responses received in Step 308 with the responses previously collected from the prepare phases in Step 307. The controller then adds a message stating that all of the prepare phases have succeeded. If a participating server failed to respond within a timeout period in Step 308, the controller may also add this information to the response page. Finally, hypertext links that allow the client to continue the conversation are included. Again, before the page is sent to the client, modification of the page may be necessary to preserve state information or to enable the system to track previously visited nodes.

There are a number of extensions and variations that are possible on the embodiments described above. One possible variation is to limit the lifetime of session IDs. The controller may record the lifetime and time of creation of each session ID—known as an ephemeral session ID—when the session ID is created in Step 208. Whenever the difference between the current time and the time of creation exceeds the lifetime of an ephemeral session ID, the ephemeral session ID has expired. The expiration of ephemeral session IDs can be checked in Step 214. If a client attempts a transaction with an expired ephemeral session ID, the error processing is handled in Step 215. The preferred method of handling an expired ephemeral session ID is to require the client to reauthenticate itself by submitting a valid user ID and password.

Another possible variation is to generate a new session ID with each transaction request. In this way, each session ID is only good for one transaction. This approach would make it harder for a malicious interloper to steal session IDs and break into accounts. To implement this variation, Step 214 may be modified to invalidate a previous session ID, generate a new session ID, record the new session ID, and preserve the new session ID into the conversation.

Another possible variation is to encrypt session IDs before they are sent to the client and decode them before they are authenticated by the controller. If a technique such as dynamic argument embedding or cookies is used, the encryption function could produce different encodings based on the URL to which the session ID is passed. Therefore, access to different URLs would require different encrypted session IDs. A malicious interloper who managed to steal an encrypted session ID would only be able to use it for a specific URL (and, possibly, with only a specific set of arguments). This would limit the damage such a person could do.

Another possible variation is for the controller to require all transactions from a particular session ID to come from the same IP address as the client that participated in the authentication process that created the session ID. To implement this feature, the IP address of a client authenticating itself is recorded when the session ID is created in Step 208. In Step 214, the transaction will be allowed to take place only if the address of the client making the request is the same as the address of the client that authenticated itself. This approach might prevent a malicious user from stealing a session ID from a client and using the session ID to break into the client's account from another machine. It is not foolproof, however, because different machines can appear to have the same IP address (for example, when the machines are behind the same firewall). Other security features, such as encryption, could be used in conjunction with this approach to further reduce the risk of accounts being broken into.

Another possible variation is for the client authentication and account information maintained by the controller (e.g., user IDs, passwords, and session IDs) to be replicated on one or more participating servers. In this way, the controller would not need to be contacted for each authentication. This approach would reduce the load on the controller and could improve system performance. Some method would be needed, however, to maintain consistency among the multiple copies of authentication and account information.

Another possible variation, which would improve system performance for heavy workloads, is to scale the controller to run on multiple servers. One of the complexities in scaling the controller to run on multiple servers, however, is the issue of how to share authentication information across multiple nodes. Authentication information could be replicated across multiple nodes, but due to the overhead and complexity of maintaining multiple consistent copies of authentication information, it may be desirable to maintain only one copy of the authentication information recorded in Step 208.

One approach for maintaining authentication information when a controller is scaled across multiple nodes is to distribute the set of all session IDs (belonging to all clients that are currently communicating with the server group) across the controller nodes. Thus, only a single copy of any one particular session ID is maintained, but the set of session IDs is distributed across the controller nodes. To implement this approach, the controller could store the session ID information of a particular client on a controller node n in Step 208. The identity of controller node n could then be encoded in a state variable in the conversation with that client. For example, the session ID variable 402 might be encoded to store both the actual session ID and the node of the controller which has stored the client's session ID. Whenever the client attempts to perform a transaction that requires authentication of its session ID, Step 214 examines the appropriate state variable preserved in the conversation with the client to determine which controller node contains the client's session ID. The client's session ID is then verified on the appropriate controller node.

As with client authentication information, client account information can be replicated on multiple controller nodes or it can be distributed across multiple controller nodes. The decision of which approach to take can be made independently of which approach is used for client authentication information. If the client account information is distributed across multiple nodes, the approach described above can be used. The identity of the controller node containing account information for a particular client can be encoded in a state variable such as the user ID variable 401.

Another possible variation is to allow the client to perform some of the functions normally performed by the server group. Using a language such as JAVA, some of the functions performed by the server group could be downloaded and performed by the client.

Another possible variation, instead of preserving both user ID and session ID state variables in a conversation, is to preserve only a session ID state variable. In this implementation, the servers would maintain a correspondence between user IDs and session IDs. The servers would then be able to calculate a user ID from a session ID.

Another possible variation is to maintain a client's password as a state variable instead of generating a session ID state variable. Since a session ID lasts only as long as a conversation, however, the advantage to using a session ID instead of a password is that a stolen session ID may be potentially less harmful than a stolen password.

Another possible variation is to implement the XA protocol to handle multi-phase commits. (For a discussion of the XA protocol, see J. Gray & A. Reuter, *Transaction Processing: Concepts & Techniques,* Morgan Kaufmann, 1993).

In our preferred embodiment, the default group of participating servers for group transactions consists of the participating servers which have been visited between the time of authentication and the time the group transaction is requested. Several variations can be easily implemented for selecting a default group. A default group of participating servers may consist of: (1) all servers which have been visited since the beginning of a conversation; (2) all servers which have been involved in simple transactions since the beginning of a conversation; (3) all servers which have been visited since a last group transaction; (4) all servers which have been involved in simple transactions since a last group transaction; and (5) all servers that participated in a last group transaction. In addition, combinations of the above default groups are possible.

In general, a default group can be determined with respect to a transaction type, an authentication type, and a critical event. Transactions may be classified into groups, including, but not limited, to the following: (1) all transactions; (2) simple transactions; and (3) group transactions. Transactions may be further classified according to authentication types, such as: (1) all transactions; (2) transactions in which authentication is required; and (3) transactions in which authentication is not required. A critical event is a point in time during a conversation defined by a transaction. For example, the following may be critical events: (1) the start of a conversation; (2) the point at which a client first provides valid identification information; (3) the last group transaction. A default group may be defined with respect to a critical subset of servers, CS(i, j, k), which is the subset of servers a client has communicated with since critical event i that provided transactions of transaction type j and authentication type k. For example, using the classifications defined above, a critical subset of servers CS(3, 1, 2) is the set of servers with which a client has communicated since the last group transaction at which transactions requiring authentication were performed.

Another possible variation is to specify a default group that does not depend on the participating servers visited. In this implementation, the visited nodes state variable 403 does not need to be preserved, and Steps 211 and 212 are not needed.

Figure 4:
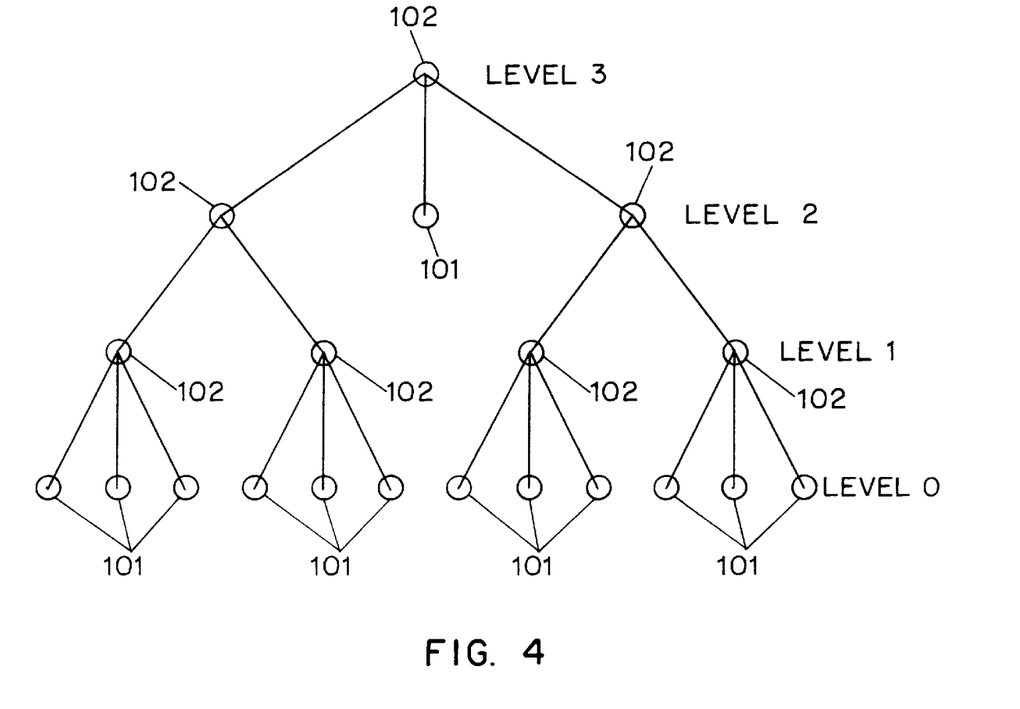
FIG. 4 is a block diagram of another overall architecture used in accordance with a preferred embodiment of the present invention.

It is also possible to have a participating server communicate with multiple controllers. As shown in FIG. 4, it is also possible to have a hierarchy of controllers where one controller coordinates actions from controllers and participating servers in the level below it.

In our preferred embodiment of steps 310 and 312 of FIG. 3, the controller sends all the information to the client as a single HTML page. If the amount of information is large, an alternative would be to break the information into several pages. The controller would send one page at a time. Each page would contain hypertext links which would allow the client to see other pages. By following (possibly several) hypertext links, the client would be able to see all of the information. This technology, of course, is not new. For example, the Lycos search engine at the URL http://www.lycos.com implements this methodology.

Another possible variation is to use digital certificates to identify a client, instead of prompting the client to enter identification information manually. A digital certificate is a string of identification information, which may be stored on a client's disk or smart card. Because digital certificates can consist of strings of information that are more lengthy and complex than the ones a client can be expected to enter by hand, the use of digital certificates may provide a more secure method of identifying the client than by having the client manually enter identification information. Alternatively, a combination of digital certificates and manual input may be used. For example, a client may be required to input a Personal Identification Number (PIN) to activate his or her smart card.

In the preferred embodiment described above, the client account information is maintained by the controller server. Another possible variation is for the controller to communicate with a certifying authority to verify the client identification information provided by the client.

Although the present invention has been described with reference to certain preferred embodiments, other embodiments are possible and will be obvious to those skilled in the art. Therefore, the spirit and scope of the appended claims should not be limited to the preferred embodiments contained in this description.

We claim:

1. In a client-server environment having a server group including one or more participating servers and one or more controller servers, where each participating server can communicate with at least one controller server, a method for coordinating actions among the servers in the server group comprising the steps of:

communicating between a client and at least one of the servers in the server group using a protocol that has limited or no defined procedures for passing state information between the client and the servers;

transmitting a request for an action requiring participation by a plurality of servers from the client to one of the servers;

communicating among the servers with at least one controller server coordinating actions of the plurality of servers in response to the request, whereby the step of coordinating action comprises defining a default group of servers by at least one controller server in response to the request by the client, wherein said default group of servers consists of one or more servers in the server group with which the client has communicated in the course of a conversation and said default group of servers is determined with respect to critical subsets of servers, where each critical subset of servers is determined with respect to a transaction type, an authentication type, and a critical event.

2. The method for coordinating actions among the servers of claim 1, in which the transaction type is selected from the group consisting of all transactions, simple transactions, and group transactions.

3. The method for coordinating actions among the servers of claim 1, in which the authentication type is selected from the group consisting of all transactions, transactions in which authentication is required, and transactions in which authentication is not required.

4. The method for coordinating actions among the servers of claim 1, in which the critical event is selected from the group consisting of the start of a conversation, the point at which a client first provides valid identification information, and a last group transaction.

5. In a client-server environment having a server group including one or more participating servers and one or more controller servers, where each participating server can communicate with at least one controller server, and in which multiple controller servers are arranged in a hierarchy of controller servers, a method for coordinating actions among the servers in the server group comprising the steps of:

communicating between a client and at least one of the servers in the server group using a protocol that has limited or no defined procedures for passing state information between the client and the servers;

transmitting a request for an action from the client to one of the servers; and communicating among a plurality of servers with at least one controller server coordinating actions of at least some of the servers in response to the request, where said step of communicating among servers includes coordinating actions by a controller server among a plurality of servers in at least one hierarchical level below it.

6. In a client-server environment having a server group including one or more participating servers and one or more controller servers, where each participating server can communicate with at least one controller server, a method for coordinating actions among the servers in the server group comprising the steps of:

communicating between a client and at least one of the servers in the server group using a protocol that has limited or no defined procedures for passing state information between the client and the servers;

transmitting a request for an action from the client to one of the servers;

communicating among a plurality of servers with at least one controller server coordinating actions of at least some of the servers in response to the request; and receiving and executing a program by the client from at least one server, whereby the client performs at least some of the functions of the server group.

7. A system for coordinating actions among the servers in a server group comprising:

a server group including one or more participating servers and one or more controller servers, wherein each participating server can communicate with at least one controller server;

a client which can communicate with at least one of the servers in the server group using a protocol that has limited or no defined procedures for passing state information between the client and the servers;

means for transmitting a request for an action requiring participation by a plurality of servers from the client to one of the servers;

means for communicating among the servers with at least one controller server coordinating actions of the plurality of servers in response to the request; and means for defining a default group of servers by at least one controller server in response to the request by the client, in which the default group of servers includes one or more servers in the server group with which the client has communicated during a conversation and in which said default group of servers is determined with respect to critical subsets of servers, where each critical subset of servers is determined with respect to a transaction type, an authentication type, and a critical event.

8. The system for coordinating actions among the servers of claim 7, in which the transaction type is selected from the group consisting of all transactions, simple transactions, and group transactions.

9. The system for coordinating actions among the servers of claim 7, in which the authentication type is selected from the group consisting of all transactions, transactions in which authentication is required, and transactions in which authentication is not required.

10. The system for coordinating actions among the servers of claim 7, in which the critical event is selected from the group consisting of the start of a conversation, the point at which a client first provides valid identification information, and a last group transaction.

11. A system for coordinating actions among the servers in a server group comprising:

a server group including one or more participating servers and one or more controller servers, wherein each participating server can communicate with at least one controller server;

a client which can communicate with at least one of the servers in the server group using a protocol that has limited or no defined procedures for passing state information between the client and the servers;

means for transmitting a request for an action requiring participation by a plurality of servers from the client to one of the servers; and means for communicating among the servers with at least one controller server coordinating actions of the plurality of servers in response to the request in which multiple controller servers are arranged in a hierarchy of controller servers and said means of communicating among servers includes coordinating actions by a controller server among a plurality of servers in at least one hierarchical level below it.

12. A system for coordinating actions among the servers in a server group comprising:

a server group including one or more participating servers and one or more controller servers, wherein each participating server can communicate with at least one controller server;

a client which can communicate with at least one of the servers in the server group using a protocol that has limited or no defined procedures for passing state information between the client and the servers;

means for transmitting a request for an action requiring participation by a plurality of servers from the client to one of the servers;

means for communicating among the servers with at least one controller server coordinating actions of the plurality of servers in response to the request; and receiving and executing a program from at least one server, whereby the client performs at least some of the functions of the server group.

13. In a client-server environment having a server group including one or more participating servers and one or more controller servers, where each participating server can communicate with at least one controller server, and in which multiple controller servers are arranged in a hierarchy of controller servers, a method for coordinating actions among the servers in the server group comprising the steps of:

communicating between a client and at least one of the servers in the server group using a protocol that has limited or no defined procedures for passing state information between the client and the servers;

transmitting a request for a first action by a client to a server that requires authentification;

providing client identification information by the client;

verifying the client identification information by one or more controller servers;

generating client authentication information by one or more controller servers;

maintaining client authentication information by one or more controller servers;

utilizing a means by one or more controller servers for preserving the client authentification information in the conversation;

transmitting a request for a second action by the client to one of the servers that requires authentication;

using the client authentication information preserved in the conversation and the client authentication information maintained by one or more servers to authenticate the client; and coordinating actions by a controller server among a plurality of servers in at least one hierarchical level below it.

14. In a client-server environment having a server group including one or more participating servers and one or more controller servers, where each participating server can communicate with at least one controller server, and in which multiple controller servers are arranged in a hierarchy of controller servers, a method for coordinating actions among the servers in the server group comprising the steps of:

communicating between a client and at least one of the servers in the server group using a protocol that has limited or no defined procedures for passing state information between the client and the servers;

transmitting a request for an action requiring participation by a plurality of servers from the client to one of the servers;

communicating among the servers with at least one controller server coordinating actions of the plurality of servers in response to the request, in which said communicating among servers includes coordinating actions by a controller server among a plurality of servers in at least one hierarchical level below it.

15. In a client-server environment having a server group including one or more participating servers and one or more controller servers, where each participating server can communicate with at least one controller server, a method for coordinating actions among the servers in the server group comprising the steps of:

communicating between a client and at least one of the servers in the server group using a protocol that has limited or no defined procedures for passing state information between the client and the servers;

transmitting a request for a first action by a client to a server that requires authentification;

providing client identification information by the client;

verifying the client identification information by one or more controller servers;

generating client authentication information by one or more controller servers;

maintaining client authentication information by one or more controller servers;

utilizing a means by one or more controller servers for preserving the client authentification information in the conversation;

transmitting a request for a second action by the client to one of the servers that requires authentication;

using the client authentication information preserved in the conversation and the client authentication information maintained by one or more servers to authenticate the client; and receiving and executing a program by the client from at least one server, whereby the client performs at least some of the functions of the server group.

16. In a client-server environment having a server group including one or more participating servers and one or more controller servers, where each participating server can communicate with at least one controller server, a method for coordinating actions among the servers in the server group comprising the steps of:

communicating between a client and at least one of the servers in the server group using a protocol that has limited or no defined procedures for passing state information between the client and the servers;

transmitting a request for an action requiring participation by a plurality of servers from the client to one of the servers;

communicating among the servers with at least one controller server coordinating actions of the plurality of servers in response to the request; and receiving and executing a program by the client from at least one server, whereby the client performs at least some of the functions of the server group.

* * * * *